US010133419B2

(12) United States Patent
Ludden et al.

(10) Patent No.: US 10,133,419 B2
(45) Date of Patent: Nov. 20, 2018

(54) FLEXIBLE PROCESSING MODULE FOR DIFFERENT INTEGRATED TOUCH AND DISPLAY CONFIGURATIONS

(71) Applicant: Synaptics Incorporated, San Jose, CA (US)

(72) Inventors: Christopher A. Ludden, Pittsford, NY (US); Jeffrey A. Small, Rochester, NY (US)

(73) Assignee: SYNAPTICS INCORPORATED, San Jose, CA (US)

( * ) Notice: Subject to any disclaimer, the term of this patent is extended or adjusted under 35 U.S.C. 154(b) by 355 days.

(21) Appl. No.: 14/224,032

(22) Filed: Mar. 24, 2014

(65) Prior Publication Data
US 2015/0268759 A1 Sep. 24, 2015

Related U.S. Application Data

(60) Provisional application No. 61/885,989, filed on Oct. 2, 2013, provisional application No. 61/863,430, filed
(Continued)

(51) Int. Cl.
G06F 3/041 (2006.01)
G06F 3/044 (2006.01)
G06F 1/16 (2006.01)
G09G 3/36 (2006.01)
G06F 1/32 (2006.01)
G02F 1/1333 (2006.01)

(52) U.S. Cl.
CPC ............ G06F 3/044 (2013.01); G06F 3/0412 (2013.01); G06F 3/0416 (2013.01); G02F 1/13338 (2013.01)

(58) Field of Classification Search
CPC ...... G06F 3/0412–3/044; G06F 3/0416; G06F 3/04886; G06F 1/1622–1/3215; G09G 3/3611–3/3696
See application file for complete search history.

(56) References Cited

U.S. PATENT DOCUMENTS 9,568,976 B2 * 2/2017 Akai ..................... G06F 1/3215
2005/0036080 A1 2/2005 Koide
(Continued)

FOREIGN PATENT DOCUMENTS

CN 102314389 A 1/2012
KR 20130069087 * 6/2013 ............. G06F 3/041

OTHER PUBLICATIONS

Alan Rich; "Shielding and Guarding", How to Exclude Interference-Type Noise. Analog Devices. 1983.
(Continued)

Primary Examiner — Lin Li
(74) Attorney, Agent, or Firm — Patterson + Sheridan, LLP

(57) ABSTRACT

Embodiments described herein include a processing system for a display device comprising an integrated capacitive sensing device that includes at least one input/output pad that is selectable between providing source signals to the display device and operating a sensor electrode for capacitive sensing. Other embodiments include a display device having a capacitive sensing device, an input device having an integrated display and capacitive sensing device, and a method for operating an integrated display and capacitive sensing device.

20 Claims, 10 Drawing Sheets

Related U.S. Application Data on Aug. 8, 2013, provisional application No. 61/863,368, filed on Aug. 7, 2013.

(56) References Cited

U.S. PATENT DOCUMENTS

| | | | |
|---|---|---|---|
| 2008/0309627 A1 | 12/2008 | Hotelling et al. | |
| 2009/0284497 A1* | 11/2009 | Lin | G02F 3/0425 |
| | | | 345/175 |
| 2010/0144391 A1 | 6/2010 | Chang et al. | |
| 2010/0194695 A1 | 8/2010 | Hotelling et al. | |
| 2010/0194698 A1 | 8/2010 | Hotelling et al. | |
| 2010/0253638 A1 | 10/2010 | Yousefpor et al. | |
| 2011/0169759 A1* | 7/2011 | Wang | G06F 3/0416 |
| | | | 345/173 |
| 2011/0193817 A1* | 8/2011 | Byun | G06F 3/0418 |
| | | | 345/174 |
| 2011/0254795 A1* | 10/2011 | Chen | G06F 3/0412 |
| | | | 345/173 |
| 2011/0298778 A1 | 12/2011 | Chiang | |
| 2012/0038585 A1 | 2/2012 | Kim | |
| 2012/0044190 A1* | 2/2012 | Yilmaz | G06F 3/0412 |
| | | | 345/174 |
| 2012/0050348 A1 | 3/2012 | Kurokawa et al. | |
| 2012/0098776 A1* | 4/2012 | Chen | G06F 3/0416 |
| | | | 345/173 |
| 2012/0206403 A1* | 8/2012 | Wang | G02F 1/13338 |
| | | | 345/174 |
| 2012/0218199 A1 | 8/2012 | Kim et al. | |
| 2012/0268423 A1 | 10/2012 | Hotelling et al. | |
| 2013/0021289 A1* | 1/2013 | Chen | G06F 1/1601 |
| | | | 345/174 |
| 2013/0057512 A1* | 3/2013 | Lillie | G06F 3/044 |
| | | | 345/174 |
| 2013/0215075 A1 | 8/2013 | Lee et al. | |
| 2013/0321296 A1 | 12/2013 | Lee et al. | |
| 2014/0111466 A1* | 4/2014 | Kim | G06F 3/044 |
| | | | 345/174 |
| 2014/0160058 A1* | 6/2014 | Chen | G06F 3/0412 |
| | | | 345/174 |
| 2014/0168047 A1* | 6/2014 | Kim | G09G 3/3648 |
| | | | 345/100 |
| 2014/0168137 A1* | 6/2014 | Pyo | G06F 3/0412 |
| | | | 345/174 |
| 2014/0192019 A1* | 7/2014 | Fukushima | G06F 3/0412 |
| | | | 345/174 |
| 2014/0204041 A1* | 7/2014 | Munechika | G06F 3/0416 |
| | | | 345/173 |
| 2014/0204049 A1* | 7/2014 | Tsai | G06F 3/0412 |
| | | | 345/174 |
| 2014/0210751 A1* | 7/2014 | Okamura | G06F 3/0416 |
| | | | 345/173 |
| 2014/0246687 A1* | 9/2014 | Ha | G06F 1/1626 |
| | | | 257/88 |
| 2014/0253525 A1* | 9/2014 | Munechika | G09G 3/3611 |
| | | | 345/204 |
| 2014/0253536 A1* | 9/2014 | Honda | G09G 3/3696 |
| | | | 345/213 |
| 2014/0285466 A1* | 9/2014 | Hayashi | G06F 3/044 |
| | | | 345/174 |
| 2014/0292688 A1* | 10/2014 | Munechika | G09G 3/3696 |
| | | | 345/173 |
| 2015/0029413 A1* | 1/2015 | Chang | G06F 3/0412 |
| | | | 349/12 |
| 2015/0054765 A1* | 2/2015 | Kurokawa | G06F 3/0412 |
| | | | 345/173 |
| 2015/0062062 A1* | 3/2015 | Han | G06F 3/0412 |
| | | | 345/174 |
| 2015/0084912 A1* | 3/2015 | Seo | G06F 3/0412 |
| | | | 345/174 |
| 2015/0268745 A1* | 9/2015 | Li | G06F 3/044 |
| | | | 345/173 |

OTHER PUBLICATIONS

U.S. Appl. No. 14/067,792, filed Oct. 30, 2013.
U.S. Appl. No. 14/042,661, filed Sep. 30, 2013.
Written Opinion of the International Searching Authority and and the International Search Report PCT/US2014/048926—21 pages dated Nov. 14, 2014.
PCT International Preliminary Report of Patentability for corresponding PCT Application No. PCT/US2014/048926 dated Feb. 9, 2016.

* cited by examiner

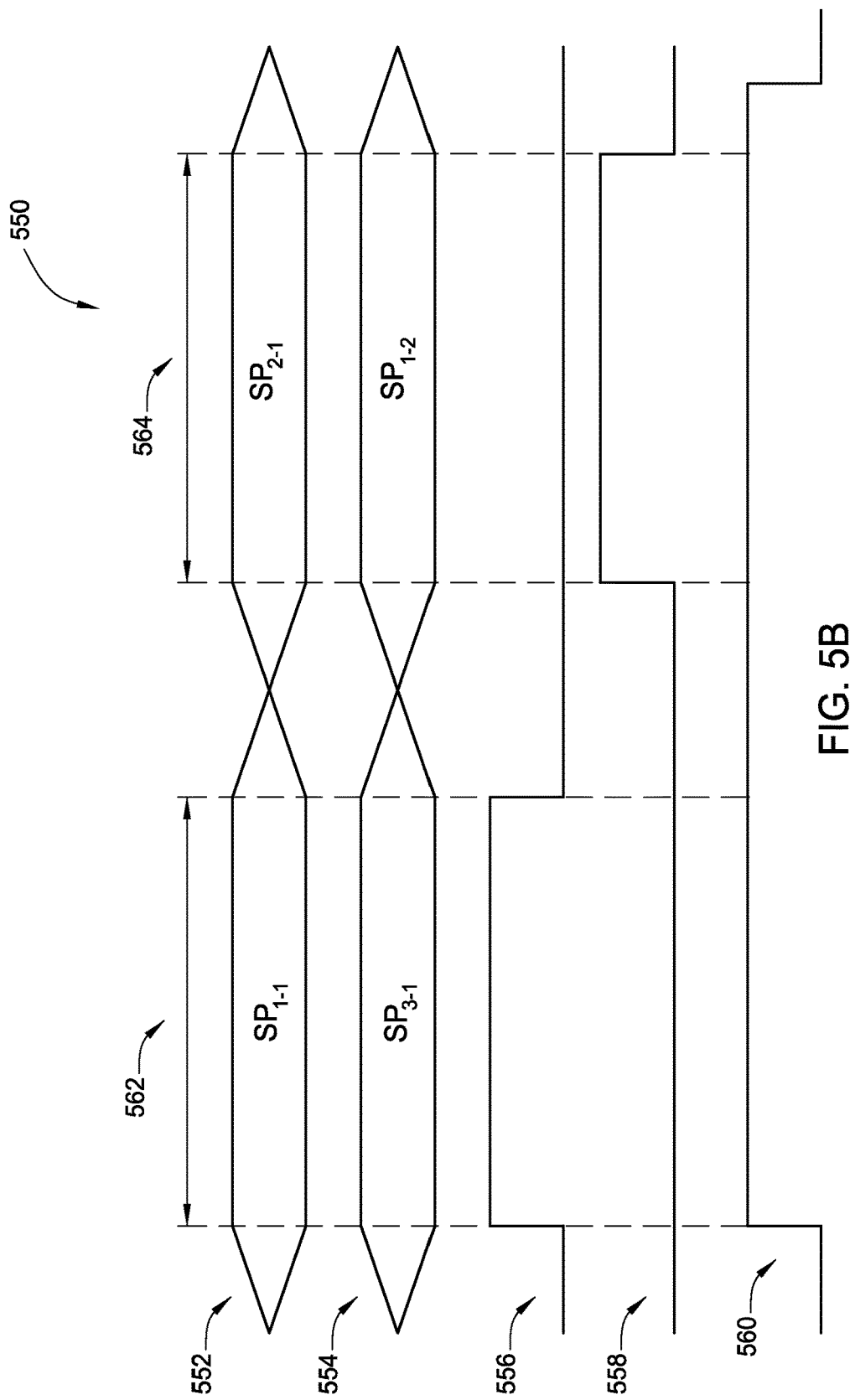

FLEXIBLE PROCESSING MODULE FOR DIFFERENT INTEGRATED TOUCH AND DISPLAY CONFIGURATIONS

This application claims the benefit of U.S. Provisional Patent Application Ser. No. 61/863,430, filed Aug. 8, 2013, U.S. Provisional Patent Application Ser. No. 61/863,368, filed Aug. 7, 2013 and U.S. Provisional Patent Application Ser. No. 61/885,989, filed Oct. 2, 2013.

BACKGROUND OF THE INVENTION

Field of the Invention

Embodiments of the present invention generally relate to a method and apparatus for touch sensing, and more specifically, a flexible processing module for different integrated touch and display configurations, and methods for using the same.

Description of the Related Art

Input devices including proximity sensor devices (also commonly called touchpads or touch sensor devices) are widely used in a variety of electronic systems. A proximity sensor device typically includes a sensing region, often demarked by a surface, in which the proximity sensor device determines the presence, location and/or motion of one or more input objects. Proximity sensor devices may be used to provide interfaces for the electronic system. For example, proximity sensor devices are often used as input devices for larger computing systems (such as opaque touchpads integrated in, or peripheral to, notebook or desktop computers). Proximity sensor devices are also often used in smaller computing systems (such as touch screens integrated in cellular phones).

Many proximity sensor devices are integrated with display devices that display colors for a user. Such integrated devices may include an integrated processing system that includes circuitry for driving the display device as well as the proximity sensor device. Further, such integrated processing system may be embodied as a single physical microchip that interfaces with display and touch elements within the integrated system. Different configurations of integrated proximity devices exist and may be utilized for different purposes. Further, such different configurations may require different configurations of integrated processing devices. However, traditionally, an integrated processing device is configured to support only a limited number of similarly configured integrated touch and display systems.

Thus, there is a need for an improved integrated processing device for integrated touch and display systems.

SUMMARY OF THE INVENTION

Embodiments described herein include a processing system for a display device comprising an integrated capacitive sensing device that includes at least one input/output pad that is selectable between providing source signals to the display device and operating a sensor electrode for capacitive sensing. Other embodiments include a display device having a capacitive sensing device, an input device having an integrated display and capacitive sensing device, and a method for operating an integrated display and capacitive sensing device.

In one embodiment, a processing system for a display device comprising an integrated capacitive sensing device is provided. The processing system includes a plurality of input/output pads. The processing system also includes display circuitry and sensor circuitry. The display circuitry is configured to drive subpixel data signals onto a display electrode of the display device to update a display of the display device through a first at least one input/output pad of the plurality of input/output pads. The sensor circuitry is configured to operate a sensor electrode of the integrated capacitive sensing device for capacitive sensing through a second input/output pad in the plurality of input/output pads. At least one input/output pad of the plurality of input/output pads is selectable between driving display update and driving for capacitive sensing.

In another embodiment, an input device is provided. The input device includes a plurality of sensor electrodes, wherein a sensor electrode of the plurality of sensor electrodes comprises at least one common electrode of a display device. The input device also includes a processing system. The processing system includes a plurality of input/output pads. The processing system is configured to drive subpixel data signals onto a display electrode of the display device to update a display of the display device through a first at least one input/output pad of the plurality of input/output pads. The processing system is also configured to drive a sensor electrode of the plurality of sensor electrodes for capacitive sensing through a second input/output pad in the plurality of input/output pads. The processing system is further configured to select between configuring at least one input/output pad of the plurality of input/output pads for display updating and for capacitive sensing.

In yet another embodiment, a method for operating a display device comprising an integrated capacitive sensing device is provided. The method includes driving subpixel data signals onto a display electrode of a display device to update a display of the display device through a first at least one input/output pad of a plurality of input/output pads. The method also includes operating a sensor electrode of the integrated capacitive sensing device for capacitive sensing through a second input/output pad of the plurality of input/output pads. The method further includes selecting between configuring at least one input/output pad of the plurality of input/output pads for display updating and for capacitive sensing.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIG. 5B is another timing diagram that illustrates various signals involved in activating the subpixel elements in the 2:1 multiplexer configuration.

Figure 1:
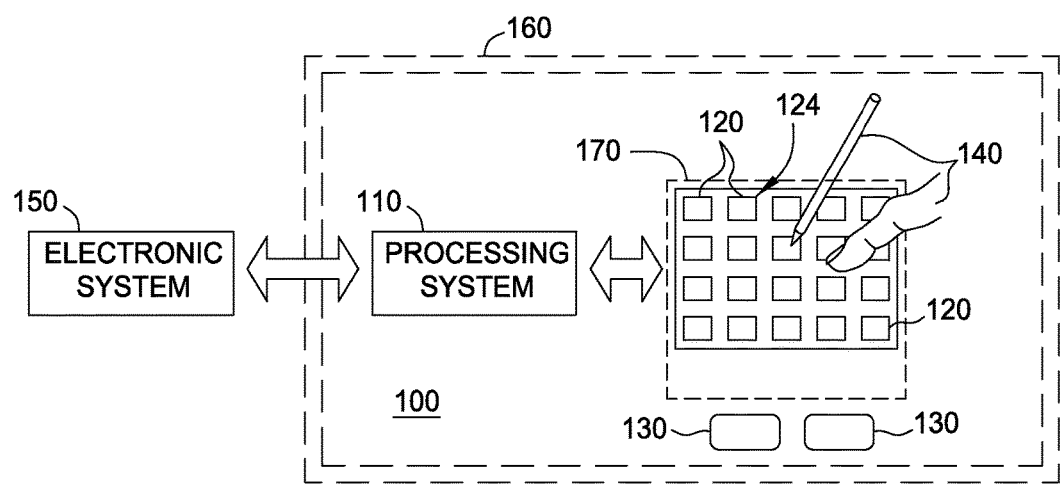
FIG. 1 is a schematic block diagram of an input device.

To facilitate understanding, identical reference numerals have been used, where possible, to designate identical elements that are common to the figures. It is contemplated that elements disclosed in one embodiment may be beneficially utilized on other embodiments without specific recitation. The drawings referred to here should not be understood as being drawn to scale unless specifically noted. Also, the drawings are often simplified and details or components omitted for clarity of presentation and explanation. The drawings and discussion serve to explain principles discussed below, where like designations denote like elements.

DETAILED DESCRIPTION

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

Various embodiments of the present technology provide input devices and methods for flexible utilization of pins in an integrated touch and display controller chip. Particularly, embodiments described herein advantageously utilize a selection mechanism to select between touch and display roles for pins on an integrated touch and display controller chip.

FIG. 1 is a schematic block diagram of an input device 100, in accordance with embodiments of the present technology. The input device 100 may be configured to provide input to an electronic system 150. As used in this document, the term "electronic system" (or "electronic device") broadly refers to any system capable of electronically processing information. Some non-limiting examples of electronic systems include personal computers of all sizes and shapes, such as desktop computers, laptop computers, netbook computers, tablets, web browsers, e-book readers, and personal digital assistants (PDAs). Additional example electronic systems include composite input devices, such as physical keyboards that include input device 100 and separate joysticks or key switches. Further example electronic systems include peripherals such as data input devices (including remote controls and mice), and data output devices (including display screens and printers). Other examples include remote terminals, kiosks, and video game machines (e.g., video game consoles, portable gaming devices, and the like). Other examples include communication devices (including cellular phones, such as smart phones), and media devices (including recorders, editors, and players such as televisions, set-top boxes, music players, digital photo frames, and digital cameras). Additionally, the electronic system could be a host or a slave to the input device.

The input device 100 can be implemented as a physical part of the electronic system, or can be physically separate from the electronic system. As appropriate, the input device 100 may communicate with parts of the electronic system using any one or more of the following: buses, networks, and other wired or wireless interconnections. Examples include I²C, SPI, PS/2, Universal Serial Bus (USB), Bluetooth, RF, and IRDA.

In FIG. 1, the input device 100 is shown as a proximity sensor device (also often referred to as a "touchpad" or a "touch sensor device") configured to sense input provided by one or more input objects 140 in a sensing region 170. Example input objects include fingers and styli, as shown in FIG. 1.

Sensing region 170 encompasses any space above, around, in and/or near the input device 100 in which the input device 100 is able to detect user input (e.g., user input provided by one or more input objects 140). The sizes, shapes, and locations of particular sensing regions may vary widely from embodiment to embodiment. In some embodiments, the sensing region 170 extends from a surface of the input device 100 in one or more directions into space until signal-to-noise ratios prevent sufficiently accurate object detection. The distance to which this sensing region 170 extends in a particular direction, in various embodiments, may be on the order of less than a millimeter, millimeters, centimeters, or more, and may vary significantly with the type of sensing technology used and the accuracy desired. Thus, some embodiments sense input that comprises no contact with any surfaces of the input device 100, contact with an input surface (e.g. a touch surface) of the input device 100, contact with an input surface of the input device 100 coupled with some amount of applied force or pressure, and/or a combination thereof. In various embodiments, input surfaces may be provided by surfaces of casings within which the sensor electrodes reside, by face sheets applied over the sensor electrodes or any casings, etc. In some embodiments, the sensing region 170 has a rectangular shape when projected onto an input surface of the input device 100.

The input device 100 may utilize any combination of sensor components and sensing technologies to detect user input in the sensing region 170. The input device 100 comprises a plurality of sensing elements 124 for detecting user input. The sensing elements 124 include a plurality of sensor electrodes 120. As several non-limiting examples, the input device 100 may use capacitive, elastive, resistive, inductive, magnetic, acoustic, ultrasonic, and/or optical techniques.

Some implementations are configured to provide images that span one, two, three, or higher dimensional spaces. Some implementations are configured to provide projections of input along particular axes or planes.

In some resistive implementations of the input device 100, a flexible and conductive first layer is separated by one or more spacer elements from a conductive second layer. During operation, one or more voltage gradients are created across the layers. Pressing the flexible first layer may deflect it sufficiently to create electrical contact between the layers, resulting in voltage outputs reflective of the point(s) of contact between the layers. These voltage outputs may be used to determine positional information.

In some inductive implementations of the input device 100, one or more sensing elements 124 pickup loop currents induced by a resonating coil or pair of coils. Some combination of the magnitude, phase, and frequency of the currents may then be used to determine positional information.

In some capacitive implementations of the input device 100, voltage or current is applied to create an electric field. Nearby input objects cause changes in the electric field, and produce detectable changes in capacitive coupling that may be detected as changes in voltage, current, or the like.

Some capacitive implementations utilize arrays or other regular or irregular patterns of capacitive sensing elements 124 to create electric fields. In some capacitive implementations, separate sensing elements 124 may be ohmically shorted together to form larger sensor electrodes. Some capacitive implementations utilize resistive sheets, which may be uniformly resistive.

As discussed above, some capacitive implementations utilize "self capacitance" (or "absolute capacitance") sensing methods based on changes in the capacitive coupling between sensor electrodes 120 and an input object. In various embodiments, an input object near the sensor electrodes 120 alters the electric field near the sensor electrodes 120, thus changing the measured capacitive coupling. In one implementation, an absolute capacitance sensing method operates by modulating sensor electrodes 120 with respect to a reference voltage (e.g. system ground), and by detecting the capacitive coupling between the sensor electrodes 120 and input objects 140.

Additionally as discussed above, some capacitive implementations utilize "mutual capacitance" (or "transcapacitance") sensing methods based on changes in the capacitive coupling between sensor electrodes 120. In various embodiments, an input object 140 near the sensor electrodes 120 alters the electric field between the sensor electrodes 120, thus changing the measured capacitive coupling. In one implementation, a transcapacitive sensing method operates by detecting the capacitive coupling between one or more transmitter sensor electrodes (also "transmitter electrodes") and one or more receiver sensor electrodes (also "receiver electrodes") as further described below. Transmitter sensor electrodes may be modulated relative to a reference voltage (e.g., system ground) to transmit modulated signals. Receiver sensor electrodes may be held substantially constant relative to the reference voltage to facilitate receipt of resulting signals. A resulting signal may comprise effect(s) corresponding to one or more modulated signals, and/or to one or more sources of environmental interference (e.g. other electromagnetic signals). Sensor electrodes 120 may be dedicated transmitter electrodes or receiver electrodes, or may be configured to both transmit and receive.

In FIG. 1, the processing system 110 is shown as part of the input device 100. The processing system 110 is configured to operate the hardware of the input device 100 to detect input in the sensing region 170. The processing system 110 comprises parts of or all of one or more integrated circuits (ICs) and/or other circuitry components. (For example, a processing system for a mutual capacitance sensor device may comprise transmitter circuitry configured to transmit signals with transmitter sensor electrodes, and/or receiver circuitry configured to receive signals with receiver sensor electrodes). In some embodiments, the processing system 110 also comprises electronically-readable instructions, such as firmware code, software code, and/or the like. In some embodiments, components composing the processing system 110 are located together, such as near sensing element(s) 124 of the input device 100. In other embodiments, components of processing system 110 are physically separate with one or more components close to sensing element(s) 124 of input device 100, and one or more components elsewhere. For example, the input device 100 may be a peripheral coupled to a desktop computer, and the processing system 110 may comprise software configured to run on a central processing unit of the desktop computer and one or more ICs (perhaps with associated firmware) separate from the central processing unit. As another example, the input device 100 may be physically integrated in a phone, and the processing system 110 may comprise circuits and firmware that are part of a main processor of the phone. In some embodiments, the processing system 110 is dedicated to implementing the input device 100. In other embodiments, the processing system 110 also performs other functions, such as operating display screens, driving haptic actuators, etc.

The processing system 110 may be implemented as a set of modules that handle different functions of the processing system 110. Each module may comprise circuitry that is a part of the processing system 110, firmware, software, or a combination thereof. In various embodiments, different combinations of modules may be used. Example modules include hardware operation modules for operating hardware such as sensor electrodes and display screens, data processing modules for processing data such as sensor signals and positional information, and reporting modules for reporting information. Further example modules include sensor operation modules configured to operate sensing element(s) 124 to detect input, identification modules configured to identify gestures such as mode changing gestures, and mode changing modules for changing operation modes.

In some embodiments, the processing system 110 responds to user input (or lack of user input) in the sensing region 170 directly by causing one or more actions. Example actions include changing operation modes, as well as GUI actions such as cursor movement, selection, menu navigation, and other functions. In some embodiments, the processing system 110 provides information about the input (or lack of input) to some part of the electronic system (e.g. to a central processing system of the electronic system that is separate from the processing system 110, if such a separate central processing system exists). In some embodiments, some part of the electronic system processes information received from the processing system 110 to act on user input, such as to facilitate a full range of actions, including mode changing actions and GUI actions.

For example, in some embodiments, the processing system 110 operates the sensing element(s) 124 of the input device 100 to produce electrical signals indicative of input (or lack of input) in the sensing region 170. The processing system 110 may perform any appropriate amount of processing on the electrical signals in producing the information provided to the electronic system. For example, the processing system 110 may digitize analog electrical signals obtained from the sensing elements 124. As another example, the processing system 110 may perform filtering or other signal conditioning. As yet another example, the processing system 110 may subtract or otherwise account for a baseline, such that the information reflects a difference between the electrical signals and the baseline. As yet further examples, the processing system 110 may determine positional information, recognize inputs as commands, recognize handwriting, and the like.

"Positional information" as used herein broadly encompasses absolute position, relative position, velocity, acceleration, and other types of spatial information. Exemplary "zero-dimensional" positional information includes near/far or contact/no contact information. Exemplary "one-dimensional" positional information includes positions along an axis. Exemplary "two-dimensional" positional information includes motions in a plane. Exemplary "three-dimensional" positional information includes instantaneous or average velocities in space. Further examples include other representations of spatial information. Historical data regarding one or more types of positional information may also be determined and/or stored, including, for example, historical data that tracks position, motion, or instantaneous velocity over time.

In some embodiments, the input device 100 is implemented with additional input components that are operated by the processing system 110 or by some other processing system. These additional input components may provide redundant functionality for input in the sensing region 170, or some other functionality. FIG. 1 shows buttons 130 near the sensing region 170 that can be used to facilitate selection of items using the input device 100. Other types of additional input components include sliders, balls, wheels, switches, and the like. Conversely, in some embodiments, the input device 100 may be implemented with no other input components.

In some embodiments, the input device 100 comprises a touch screen interface, and the sensing region 170 overlaps at least part of an active area of a display screen of the display device 160. For example, the input device 100 may comprise substantially transparent sensing elements 124 overlaying the display screen and provide a touch screen interface for the associated electronic system. The display screen may be any type of dynamic display capable of displaying a visual interface to a user, and may include any type of light emitting diode (LED), organic LED (OLED), cathode ray tube (CRT), liquid crystal display (LCD), plasma, electroluminescence (EL), or other display technology. The input device 100 and the display device 160 may share physical elements. For example, some embodiments may utilize some of the same electrical components for displaying and sensing. As another example, the display device 160 may be operated in part or in total by the processing system 110.

It should be understood that while many embodiments of the present technology are described in the context of a fully functioning apparatus, the mechanisms of the present technology are capable of being distributed as a program product (e.g., software) in a variety of forms. For example, the mechanisms of the present technology may be implemented and distributed as a software program on information bearing media that are readable by electronic processors (e.g., non-transitory computer-readable and/or recordable/writable information bearing media readable by the processing system 110). Additionally, the embodiments of the present technology apply equally regardless of the particular type of medium used to carry out the distribution. Examples of non-transitory, electronically readable media include various discs, memory sticks, memory cards, memory modules, and the like. Electronically readable media may be based on flash, optical, magnetic, holographic, or any other storage technology.

Figure 2:
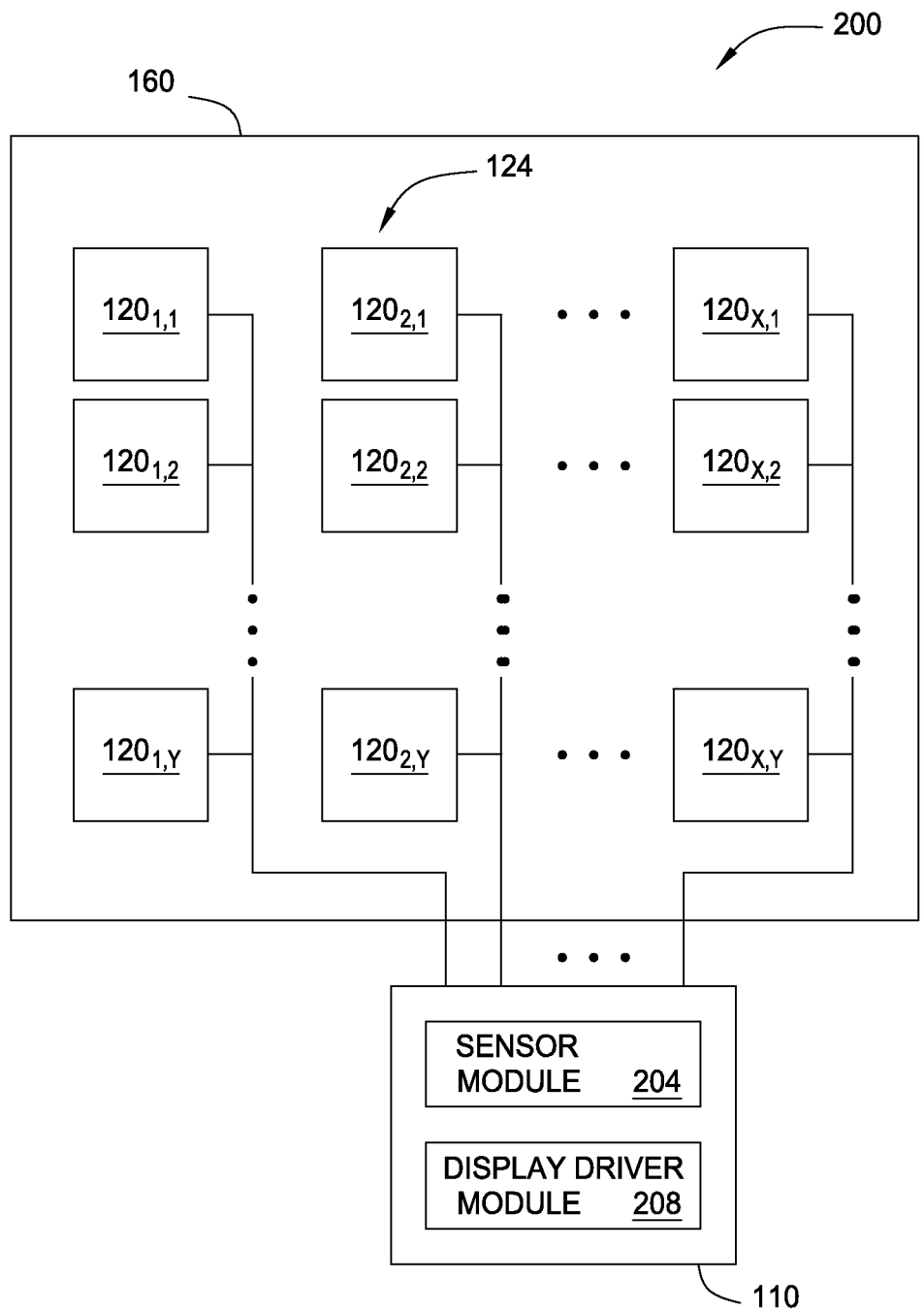
FIG. 2 illustrates a simplified exemplary array of sensor elements that may be used in the input device of FIG. 1.

FIG. 2 shows a portion of an exemplary pattern 200 of sensing elements 124 within a display device 160 configured to sense in the sensing region 170 associated with the pattern, according to some embodiments. For clarity of illustration and description, FIG. 2 shows the sensor electrodes 120 of the sensing elements 124 in a pattern of simple rectangles, and does not show various other components. The exemplary pattern 200 of sensing elements 124 comprises an array of sensor electrodes $120_{X,Y}$ (referred collectively as sensor electrodes 120) arranged in X columns and Y rows, wherein X and Y are positive integers. It is contemplated that the pattern of sensing elements 124 comprises a plurality of sensor electrodes 120 having other configurations, such as polar arrays, repeating patterns, non-repeating patterns, a single row or column, or other suitable arrangement. The sensor electrodes 120 are coupled to the processing system 110 and utilized to determine the presence (or lack thereof) of an input object 140 in the sensing region 170.

The arrangement of sensor electrodes 120 (120-1, 120-2, 120-3, . . . 120-n) may be utilized to detect the presence of an input object via absolute sensing techniques. That is, processing system 110 is configured to drive each sensor electrode 120 with a signal and receive a resulting signal comprising effects corresponding to the modulated signal, which is utilized by the processing system 110 or other processor to determine the position of the input object.

The sensor electrodes 120 are typically ohmically isolated from each other. That is, one or more insulators separate the sensor electrodes 120 and prevent them from electrically shorting to each other. In some embodiments, the sensor electrodes 120 are separated by an insulative gap. The insulative gap separating the sensor electrodes 120 may be filled with an electrically insulating material, or may be an air gap.

The sensor electrodes 120 (120-1, 120-2, 120-3, . . . 120-n) may be utilized to detect the presence of an input object via profile sensing techniques. That is, processing system 110 is configured drive the sensor electrodes 120 row-by-row and then column-by-column, with modulated signals. The signals generated in response to driving the sensor electrodes 120 in this configuration provide information related to the position of an input object 140 within the sensing region.

The sensor electrodes 120 may be split into groups of transmitter and receiver electrodes utilized to detect the presence of an input object via transcapacitive sensing techniques. That is, processing system 110 may drive a first group of sensor electrodes 120 with a modulated signal and receive resulting signals with the second group of sensor electrodes 120, where a resulting signal comprising effects corresponding to the modulated signal. The resulting signal is utilized by the processing system 110 or other processor to determine the position of the input object.

The input device 100 may be configured to operate in any one of the modes described above. The input device 100 may also be configured to switch between any two or more of the modes described above.

Areas of localized capacitive coupling may be termed "capacitive pixels." Capacitive pixels may be formed between an individual sensor electrode 120 and ground in the first mode of operation, between groups of sensor electrodes 120 and ground in the second mode of operation, and between groups of sensor electrodes 120 used as transmitter and receiver electrode in the third mode of operation. The capacitive coupling changes with the proximity and motion of input objects 140 in the sensing region 170 associated with the sensing elements 124, and thus may be used as an indicator of the presence of the input object in the sensing region of the input device 100.

In some embodiments, the sensor electrodes 120 are "scanned" to determine these capacitive couplings. That is, in one embodiment, one or more of the sensor electrodes 120 are driven to transmit modulated signals. Transmitters may be operated such that one transmitter electrode transmits at one time, or multiple transmitter electrodes transmit at the same time. Where multiple transmitter electrodes transmit simultaneously, the multiple transmitter electrodes may transmit the same modulated signal and effectively produce an effectively larger transmitter electrode. Alternatively, the multiple transmitter electrodes may transmit different modulated signals. For example, multiple transmitter electrodes may transmit different modulated signals according to one or more coding schemes that enable their combined effects on the resulting signals to be independently determined.

The sensor electrodes 120 configured as receiver sensor electrodes may be operated singly or multiply to acquire resulting signals. The resulting signals may be used to determine measurements of the capacitive couplings at the capacitive pixels.

In another embodiment, the sensor electrodes may be operated such that more than one sensor electrodes is driven and received with at a time, or sensor electrodes are driven and received with at the same time. In such embodiments, an absolute capacitive measurement may be obtained from each of the one or more sensor electrodes 120 simultaneously.

In one embodiment each of the sensor electrodes 120 are simultaneously driven and received with, obtaining an absolute capacitive measurement simultaneously from each of the sensor electrodes 120. In various embodiments, processing system 110 may configured to selectively drive and receive with a portion of sensor electrodes 120. For example, the sensor electrodes may be selected based on, but not limited to, an application running on the host processor, a status of the input device, and an operating mode of the sensing device.

A set of measurements from the capacitive pixels form a "capacitive image" (also "capacitive frame") representative of the capacitive couplings at the pixels. Multiple capacitive images may be acquired over multiple time periods, and differences between them used to derive information about input in the sensing region. For example, successive capacitive images acquired over successive periods of time can be used to track the motion(s) of one or more input objects entering, exiting, and within the sensing region.

The background capacitance of the input device 100 is the capacitive image associated with no input object in the sensing region 170. The background capacitance changes with the environment and operating conditions, and may be estimated in various ways. For example, some embodiments take "baseline images" when no input object is determined to be in the sensing region 170, and use those baseline images as estimates of their background capacitances.

Capacitive images can be adjusted for the background capacitance of the input device 100 for more efficient processing. Some embodiments accomplish this by "baselining" measurements of the capacitive couplings at the capacitive pixels to produce a "baselined capacitive image." That is, some embodiments compare the measurements forming a capacitance image with appropriate "baseline values" of a "baseline image" associated with those pixels, and determine changes from that baseline image.

In some touch screen embodiments, one or more of the sensor electrodes 120 comprise one or more common electrodes used in updating the display 160 of a display screen. In one or more embodiment, the common electrodes comprise one or more segments of a $V_{COM}$ electrode, a source drive line, gate line, an anode electrode or cathode electrode, or any other display element. These common electrodes may be disposed on an appropriate display screen substrate. For example, the common electrodes may be disposed on the a transparent substrate (a glass substrate, TFT glass, or any other transparent material) in some display screens (e.g., In Plane Switching (IPS) or Plane to Line Switching (PLS) Organic Light Emitting Diode (OLED)), on the bottom of the color filter glass of some display screens (e.g., Patterned Vertical Alignment (PVA) or Multi-domain Vertical Alignment (MVA)), over an emissive layer (OLED), etc. In such embodiments, the common electrode can also be referred to as a "combination electrode", since it performs multiple functions. In various embodiments, each of the sensor electrodes 120 comprises one or more common electrodes. In other embodiments, at least two sensor electrodes 120 may share at least one common electrode.

In various touch screen embodiments, the "capacitive frame rate" (the rate at which successive capacitive images are acquired) may be the same or be different from that of the "display frame rate" (the rate at which the display image is updated, including refreshing the screen to redisplay the same image). In various embodiments, the capacitive frame rate is an integer multiple of the display frame rate. In other embodiments, the capacitive frame rate is a fractional multiple of the display frame rate. In yet further embodiments, the capacitive frame rate may be any fraction or integer of the display frame rate.

Continuing to refer to FIG. 2, the processing system 110 coupled to the sensing electrodes 120 includes a sensor module 204 comprising sensor circuitry and a display driver module 208 comprising display circuitry. The sensor module 204 includes sensor circuitry configured to drive the sensor electrodes 120 for capacitive sensing during periods in which input sensing is desired. In one embodiment, driving the sensor electrodes 120 for capacitive sensing comprises driving the sensor electrodes 120 with a modulated signal. The modulated signal is generally a modulated signal containing one or more bursts over a period of time allocated for input sensing. The modulated signal may have an amplitude, frequency and voltage which may be changed to obtain more robust location information of the input object in the sensing region 170. The sensor module 204 may be selectively coupled to one or more of the sensor electrodes 120. For example, the transmitter module 204 may be coupled to selected portions of the sensor electrodes 120. In another example, the sensor module 204 may be coupled to a different portion of the sensor electrodes 120. In yet another example, the sensor module 204 may be coupled to all the sensor electrodes 120 and operate in either an absolute or transcapacitive sensing mode. The sensor module may be further configured to drive one or more sensor electrodes with a shield signal, having a substantially constant voltage or a varying voltage signals (also referred to as a guard signal) during capacitive sensing periods. The shield signal may have a similar, higher or lower amplitude than the modulated signal.

In one or more embodiments, capacitive sensing (or input sensing) and display updating may occur during at least partially overlapping periods. For example, as a common electrode is driven for display updating, the common electrode may also be driven for capacitive sensing. In another embodiment, capacitive sensing may occur during non-display update periods, which do not overlap with periods during which display updating may occur. In various embodiments, the non-display update periods may occur between two display update periods of a display frame and may be at least as long in time as the display update period. In such embodiment, the non-display update period may be referred to as a long horizontal blanking period, long h-blanking period or a distributed blanking period. In other embodiments, the non-display update period may comprise horizontal blanking periods and vertical blanking periods. Processing system 110 may be configured to drive sensor electrodes 120 for capacitive sensing during any one or more of or any combination of the different non-display update times, or during a display update time.

The sensor module 204 may further include circuitry and/or software configured to receive a resulting signal with the sensor electrodes 120 comprising effects corresponding to the modulated signal during periods in which input sensing is desired. In one embodiment, the resulting signals received with a first sensor electrode may comprise effects corresponding to a modulated signal driven onto a second sensor electrode. In another embodiment, the resulting signals received with a first sensor electrode comprise effects corresponding to a modulated signal driven onto the first sensor electrode. The sensor module 204 may determine a position of the input object 140 in the sensing region 170 or may provide a signal including information indicative of the resulting signal to another module or processor, for example, determination module or a processor of the electronic device 150 (i.e., a host processor), for determining the position of the input object 140 in the sensing region 170.

The display driver module 208 may be included in or separate from the processing system 110. The display driver module 208 includes display circuitry configured to provide display image update information to the display of the display device 160 during non-sensing (e.g., display updating) periods or during sensing periods.

As discussed above, the sensor electrodes 120 of the sensing elements 124 may be formed as discrete forms, e.g. polygons, bars, pads, lines or other shape, which are ohmically isolated from one another. The sensor electrodes 120 may be electrically coupled through circuitry to form electrodes having larger plan area relative to a discrete one of the sensor electrodes 120. The sensor electrodes 120 may be fabricated from opaque or non-opaque conductive materials. In embodiments wherein the sensor electrodes 120 are utilized with a display device, it may be desirable to utilize non-opaque conductive materials for the sensor electrodes 120. In embodiments wherein the sensor electrodes 120 are not utilized with a display device, it may be desirable to utilize opaque conductive materials having lower resistivity for the sensor electrodes 120 to improve sensor performance. Materials suitable for fabricating the sensor electrodes 120 include ITO, aluminum, silver, copper, and conductive carbon materials, among others. The sensor electrodes 120 may be formed as contiguous body of conductive material having little or no open area (i.e., having a planar surface uninterrupted by holes), or may alternatively be fabricated to form a body of material having openings formed therethrough. For example, the sensor electrodes 120 may be formed from a mesh of conductive material, such as a plurality of interconnected thin metal wires. In one embodiment, at least one of the length and width of the sensor electrodes 120 may be in a range of about 1 to about 2 mm. In other embodiments, at least one of the length and width of the sensor electrodes may be less than about 1 mm or greater than about 2 mm. In other embodiment, the length and width may not be similar, and one of the length and width may be in the range of about 1 to about 2 mm. Further, on various embodiments, the sensor electrodes 120 may comprise a center to center pitch in the range of about 4 to about 5 mm; however, in other embodiments, the pitch may be less than about 4 mm or greater than about 5 mm.

Figure 3:
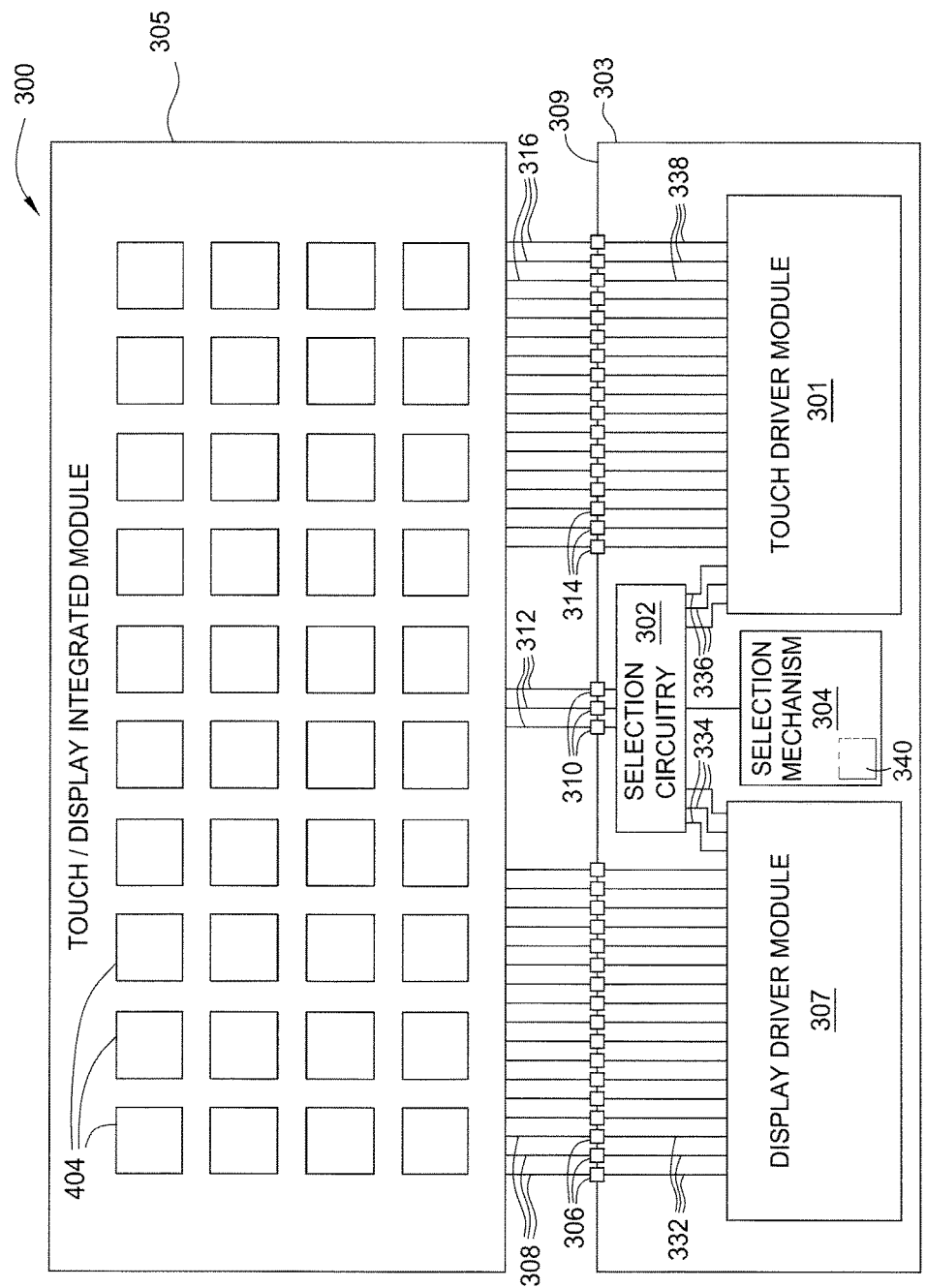
FIG. 3 illustrates an integrated touch and display system.

FIG. 3 illustrates an integrated touch and display system 300. The integrated touch and display system ("touch/display system") 300 includes an integrated touch and display module ("touch/display module") 305 coupled to a touch and display interface module ("interface module") 303. The touch/display module 305 includes display elements 404 that produce visible colors for observation by a user as well as touch elements that produce touch signals in response to an input object 140 in the proximity of the touch/display module 305. The display elements 404 may be part of display device 160. The touch elements may include all or some of sensor electrodes 120 depicted in FIGS. 1 and 2. For clarity, the touch elements are not illustrated in FIG. 3. However, touch elements may be integrated into touch/display module 305 in any suitable manner.

The interface module 303 is embodied as a single chip that includes a display driver module 307 and touch driver module 301. The display driver module 307 may include all or a portion of display driver module 208. Similarly, the touch driver module 301 may include all or a part of sensor module 204.

Interface module 303 includes an interface edge 309 that includes display pads 306, shared pads 310, and touch pads 314 (collectively "input/output pads"), for interface with the touch/display module 305. Generally, all touch input/output and display input/output between interface module 303 and touch/display module 305 occurs through these input/output pads. Further, typically, all input/output pads exist on a single edge of interface module 303—the interface edge 309. Because all input/output pads are disposed on a single edge of the interface module 303, there is a limit to the total number of input/output pads that may be present in interface module 303. This limitation may be due to manufacturing and/or operational limitations.

Display traces 332 from display driver module 307 are coupled to display pads 306, which are coupled to external display traces 308 for connection to touch/display module 305. Display traces 332 carry display driver signals, such as signals for updating subpixel elements 404. Touch traces 338 from touch driver module 301 are coupled to touch pads 314, which are coupled to external touch traces 316 for connection to touch/display module 305. Touch traces 338 carry touch driver signals, such as signals for driving touch electrodes 120 (not depicted in FIG. 3).

Selection circuitry 302 receives both display signals, from display driver module 307, and touch signals, from touch driver module 301, through display traces 334 coupled to selection circuitry 302 and through touch traces 336 coupled to selection circuitry 302. Selection circuitry 302 is configurable via selection mechanism 304 to select between signals provided by either display driver module 307 or touch driver module 301, for each of the shared pads 310. In other words, each of the shared pads 310 may carry signals corresponding to either display driver module 307 or touch driver module 301. In various embodiments, selection mechanism 304 includes registers 340 programmable by software or firmware, jumpers, or other mechanisms for selecting signals.

Figure 4A:
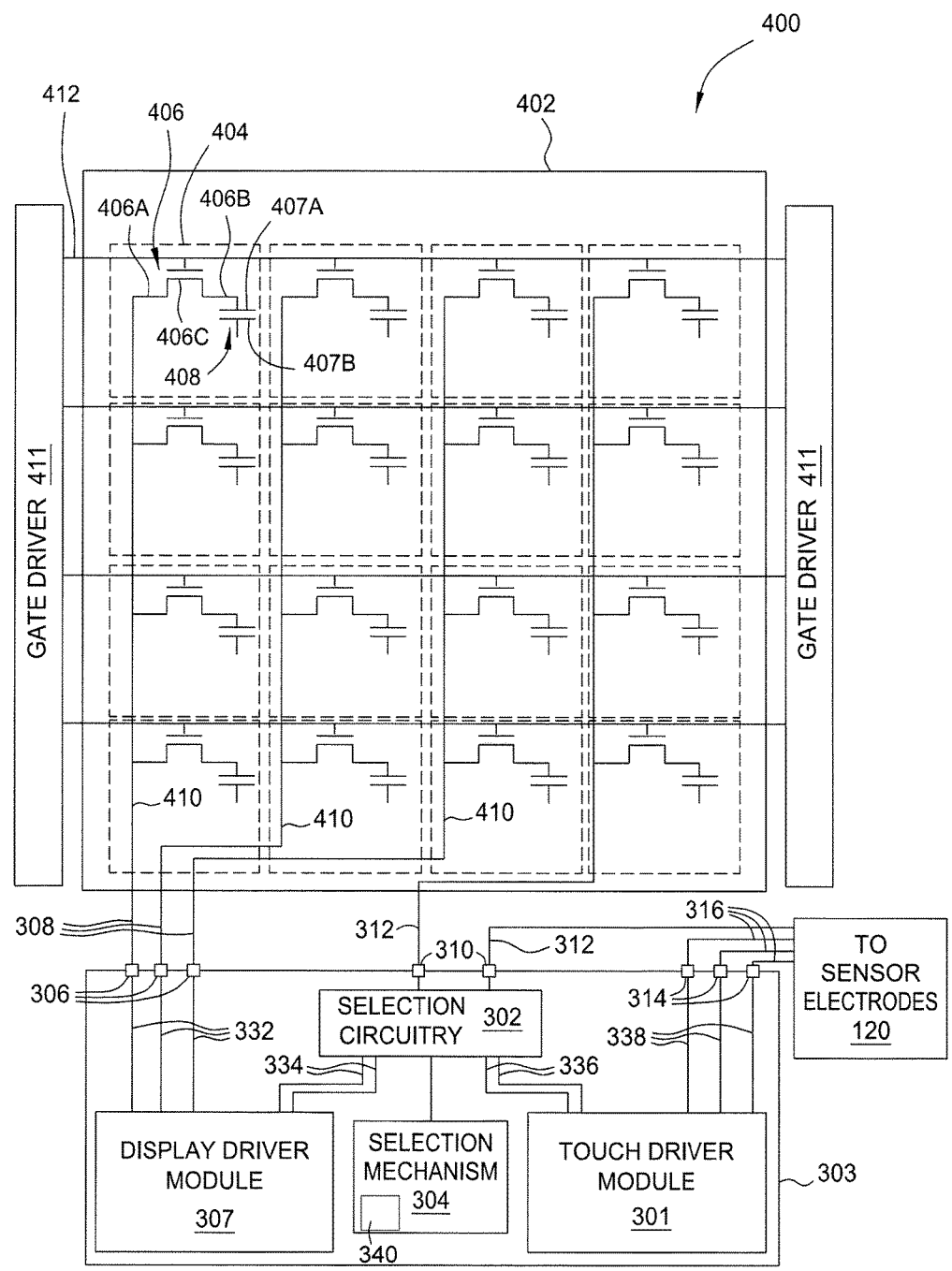
FIG. 4A illustrates a first configuration of an integrated touch/display system.
Figure 5A:
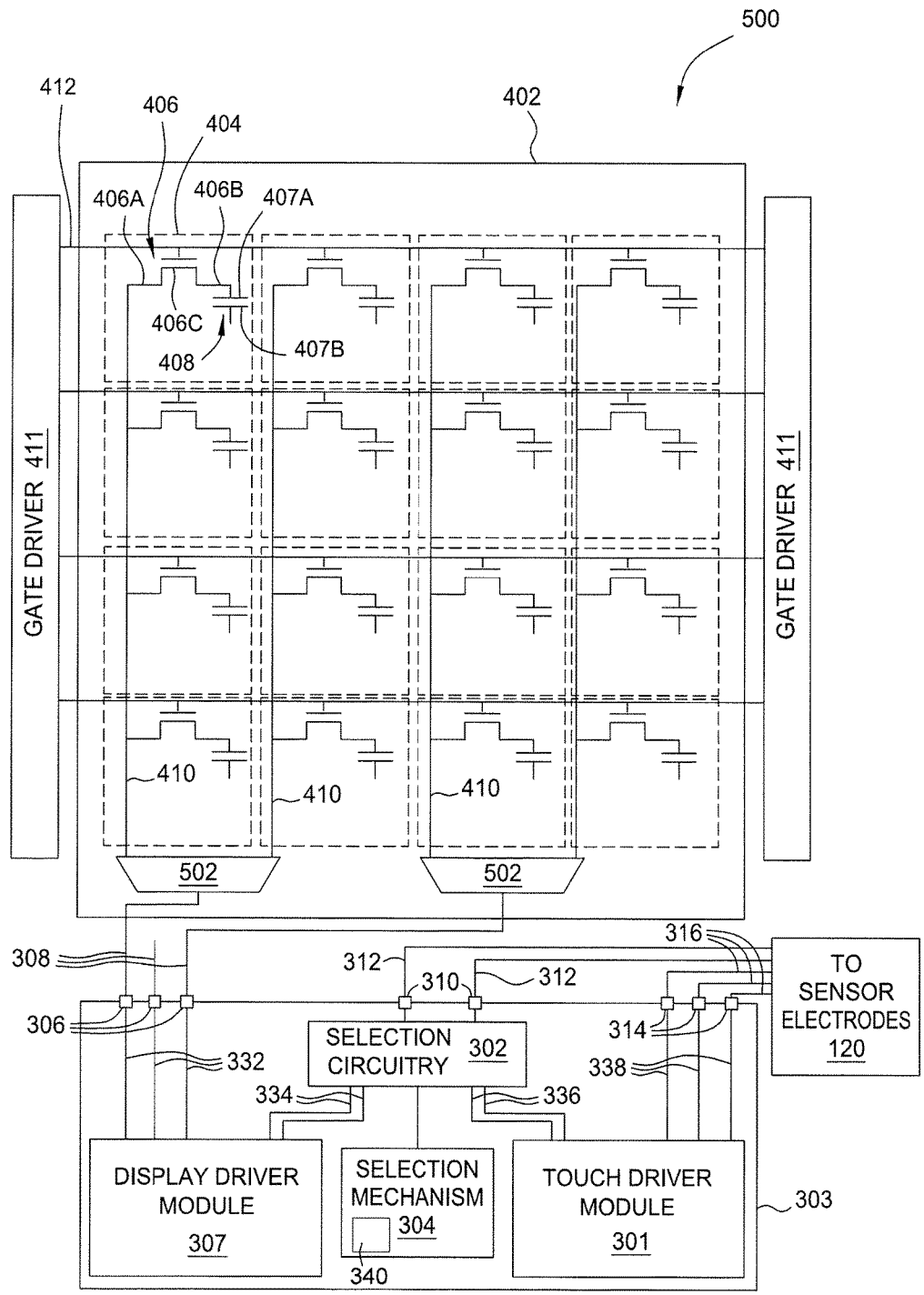
FIG. 5A illustrates a second configuration, in which source lines for each column of subpixel elements are coupled to 2:1 multiplexers.
Figure 6A:
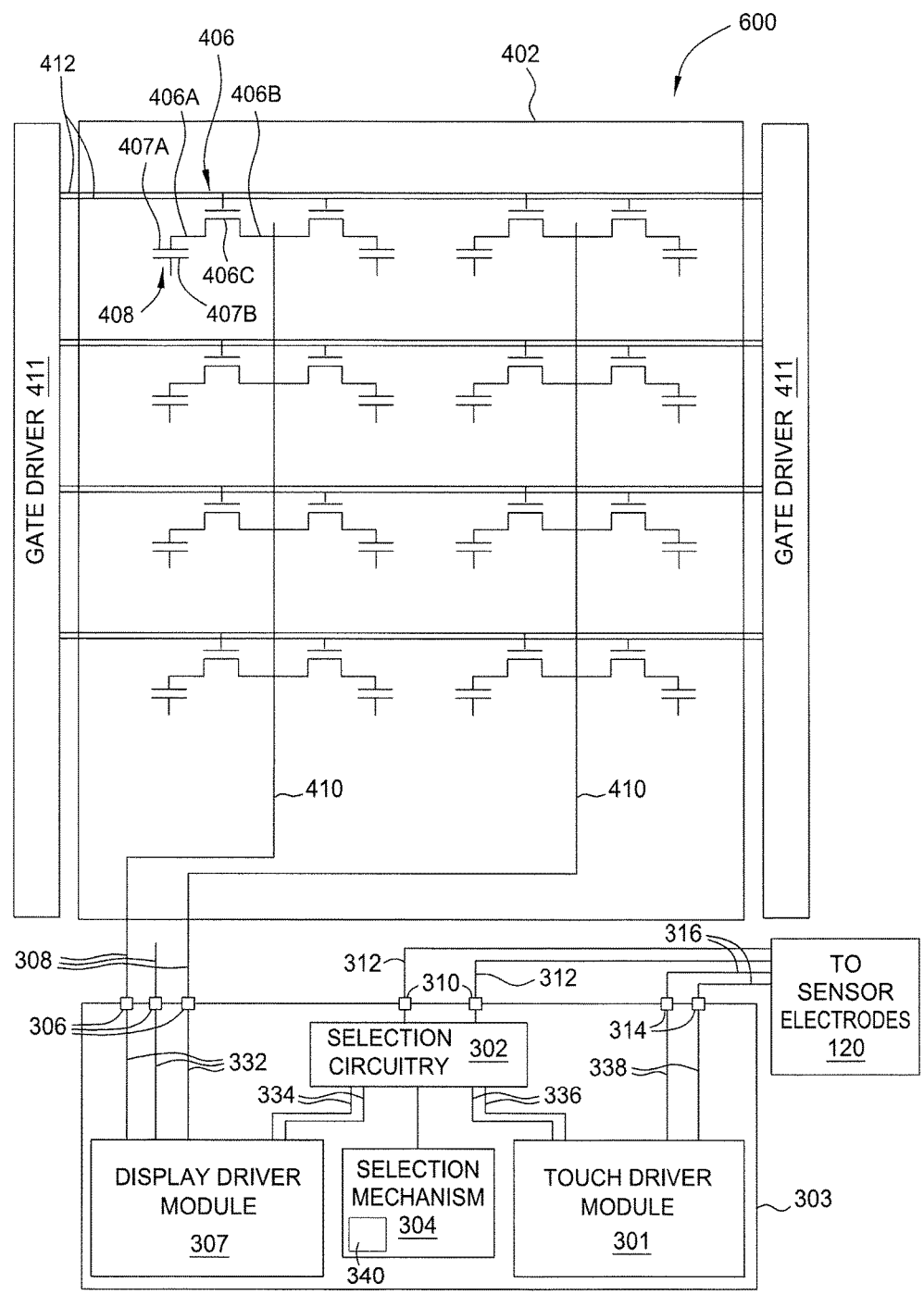
FIG. 6A illustrates a third configuration, in which source lines are shared between adjacent columns of subpixel elements, and alternating subpixel elements are coupled to different gate lines, in a dual-gate configuration.

Providing selection logic 302 to select between input from either display driver module 307 or touch driver module 301 allows interface module 303 to support a number of different configurations for touch/display module 305. With traditional interface modules 303, each pad does not have the capability to be switched between touch and display. Thus, traditional interface modules cannot support multiple different configurations that require different numbers of pads that support touch and display. With the flexible shared pads 310 in interface module 303, pads may be switched between touch and display functionality, thus allowing interface module 303 to be utilized in different types of integrated touch/display systems. FIGS. 4A-6B illustrate several different example integrated touch/display system configurations that benefit from the flexible interface module 303 disclosed herein. The details of these example configurations should be taken as illustrative and not limiting. Further, the configurations depicted are presented in a conceptual manner, in which various elements that are not necessary to illustrate the invention may be omitted. For example, FIGS. 4A, 5A, and 6A illustrate only a limited number of subpixel elements 404. In an actual touch/display module 305, a much larger number of subpixel elements 404 (for example, thousands) would be present, depending on the display resolution. Further, FIGS. 4A, 5A, and 6A illustrate only a limited number of input/output pads. It should be understood that a single interface module 303, having a fixed number of input/output pads may be utilized in varying configurations, by altering the coupling between shared pads 310, display driver module 307, and touch driver module 301. Although described below in the context of liquid crystal display technology, other types of display technologies may be substituted as is generally known in the art. Further, although "source lines" are generally described below, other analogous items may be substituted for source lines, as is generally known in the art. In the present disclosure and in the claims provided below, the term "subpixel data line" is used to generically refer to source lines and analogous technical items. Similarly, the terms "source data" and "subpixel data" are used interchangeably herein.

FIG. 4A illustrates a first configuration 400 of an integrated touch/display system 400. This first configuration 400 is characterized by having no source line multiplexing, which means that each display output pad 352 is coupled to a single source line 410. Such configurations are typical in amorphous Silicon (s-Si) type displays, where functional components such as multiplexers are difficult to form on the a-Si substrate.

The integrated touch/display system 400 includes touch/display module 402 and an interface module 303. As described above, touch/display module 402 includes display elements (subpixel elements) 404, which display colors for viewing by a user. Also as described above, the interface module 303 includes display driver module 307 and touch driver module 301 for providing display signals and touch signals, respectively, to touch/display module 402.

The subpixel elements 404 in touch/display module 402 may be assigned individual colors. Multiple subpixel elements 404 may together form a single screen pixel, as is generally known. By adjusting the light intensity associated with different subpixel elements 404 in a single screen pixel, different display colors may be produced.

The subpixel elements 404 include subpixel transistors 406 that each includes a source 406a, a drain 406b, and a gate 406c. The drain 406b is coupled to light element 408. The light element 408 may be, without limitation, a light-producing element in an organic light-emitting diode (OLED), a light-modulating element in a liquid crystal display (LCD).

The source 406a is coupled to source line 410, and the gate 406c is coupled to gate line 412. The gate line 412 acts as a row-select mechanism and is activated by gate driver 411. When the gate line 412 is asserted, the subpixel transistors 406 for the row corresponding to the gate line 412 are switched on, and current may flow from source 406a to drain 406b of the subpixel transistors 406.

The source line 410 serves to provide a signal, typically in the form of an analog voltage, to a particular light element 408 when the corresponding subpixel transistor 406 is switched on by a corresponding gate line 412. The light element 408 typically includes a subpixel electrode 407a, which is coupled to the drain 406b of the subpixel transistor 406, and a reference electrode 407b. In an LCD, the voltage differential between the subpixel electrode 407a and the reference electrode 407b determines the light permittivity through a selectively light-permissible material, such as a liquid crystal material within the touch/display module 305. In an OLED, the voltage differential between the subpixel electrode 407a and the reference electrode 407b determines an amount of light emitting by a light-emitting material within the touch/display module 305. In some embodiments, the reference electrode 407b is a portion of a common voltage ($V_{COM}$) layer.

In the configuration 400 depicted in FIG. 4A, selection circuitry 302 selects signals from display driver module 307 and from touch driver module 301 for the input/output pads 310. Each input/output pad that carries display signals is coupled to a single column of subpixel elements 404, through a single source line 410. Each input/output pad that carries touch signals is coupled to sensor electrodes 120. The sensor electrodes 120 are not specifically depicted in FIG. 4A, but may be integrated in touch/display module 305 as described above with respect to FIGS. 1-3. Further, the number of traces and input/output pads from display driver module 307, touch driver module 301, and selection circuitry 302 that are depicted in FIG. 4A (as well as FIGS. 5A and 6A) may not be equivalent to the number depicted in FIG. 3. However, it should be understood that in combination, FIGS. 3, 4A, 5A, and 6A illustrate the manner in which a single chip—interface chip 303—may be utilized in different configurations.

In other configurations, such as the configuration 500 depicted in FIG. 5A, and the configuration 600 depicted in FIG. 6A, each input/output pad in interface module 303 is coupled to more than one column of subpixel elements 404, either through a multiplexer, or through the use of a dual-gate mechanism, as discussed in more detail below.

Figure 4B:
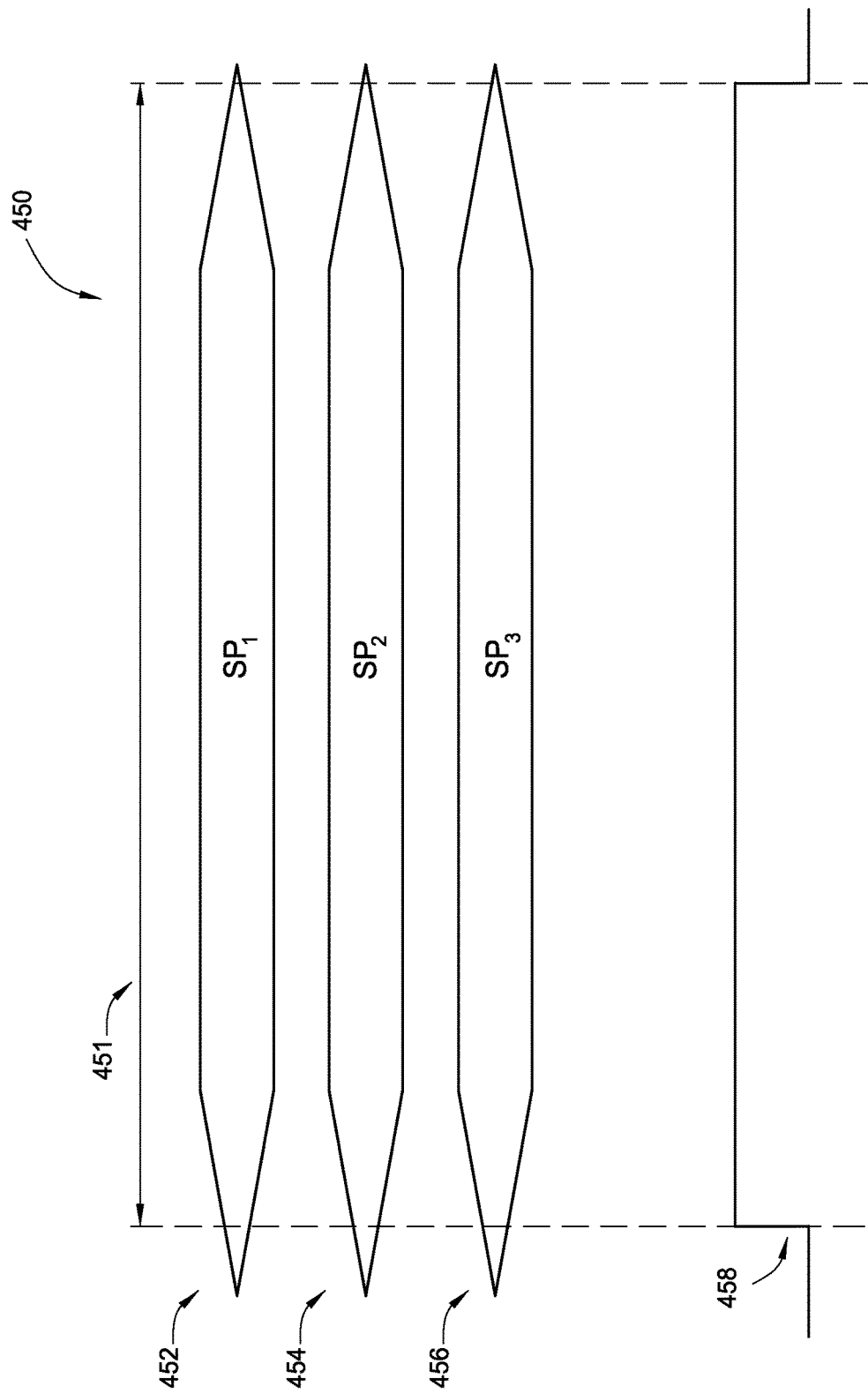
FIG. 4B is a timing diagram that illustrates various signals involved in activating the sub elements in a no-multiplexer no-dual-gate configuration.

FIG. 4B is a timing diagram 450 that illustrates various signals involved in activating the subpixel elements 404 in the no-multiplexer no-dual-gate configuration 400, in a time period 451. The time period 451 corresponds to a time period during which display signals are provided to a single row of subpixel elements 404. The timing diagram 450 includes a first source graph 452, a second source graph 454, and a third source graph 456. These three different source graphs 452 correspond to adjacent source lines 410 coupled to adjacent columns of subpixel elements 404. The timing diagram 450 also includes a gate graph 458 that corresponds to a single gate line 412.

The gate graph 458 indicates that the gate line 412 corresponding to the gate graph 458 is activated. The first source graph 452 indicates that display data is being provided to a first subpixel element 404 (labeled $SP_1$) that corresponds to both the gate line 412 and to the source line 410 associated with the first source graph 452. Similarly, the second source graph 454 indicates that display data is being provided to the a second subpixel element 404 ($SP_2$) that corresponds to the gate line 412 and the source line 410 associated with the second source graph 454. In one example, this second subpixel element 404 is adjacent to the first subpixel element 404. The third source graph 456 indicates that display data is being provided to a third subpixel element 404 ($SP_3$) that corresponds to the gate line 412 and the source line 410 associated with the third source graph 456. In one example, the third subpixel element 404 is adjacent to the second subpixel element 404 discussed above. For any particular row, the corresponding gate line 412 is asserted only once, and all source lines 410 provide data to the subpixel elements within that row.

It should be understood that the timing diagram 450 provides timing information for only a small portion of a display—specifically, for three subpixel elements 404 within a single row. For an entire display, when any particular gate line 412 is asserted, all source lines 410 provide subpixel data to the subpixel elements in the row associated with that gate line 412. This process of providing data to subpixel elements 404 in a particular row is repeated until the subpixel elements 404 for all rows for a display have been provided with subpixel data. A different gate line 412 is asserted for each different row of subpixel elements 404.

In one or more embodiments, one or more the source line may be selected and coupled with a sensor electrode through one or more switches of a sensor switching mechanism. The sensor switching mechanism may comprise a plurality of selection lines; each coupled with at least one transistor disposed on a TFT layer of the display device and may be configured to couple a source line with at least one sensor electrode for capacitive sensing. In various embodiments, one or more portions of the sensor switching mechanism may be disposed within the sensor module and/or display driver module. In other embodiments, the sensor switching mechanism may be integrated within the gate driver of the display device. In such embodiments, the connection to the sensor electrodes from the sensor switching mechanism may be disposed between connections to gate lines within the shift register of the gate driver. The location of the sensor switching mechanism within the shift register of the gate driver may be based on the touch sensing timing. For example, if touch sensing was to occur between to display rows of the display, a connection from the sensor switching mechanism would be disposed between the corresponding shift registers within the gate driver. Further, the connections could also be group at the end of and/or at the beginning of the shift registers. Further, any combination of disposing the connection between shift registers or disposing them at the beginning or end of the shift registers may be used.

FIG. 5A illustrates a second configuration 500, in which source lines 410 for each column of subpixel elements 404 are coupled to 2:1 multiplexers 502. More specifically, two adjacent source lines 410 are coupled to 2:1 multiplexers 502. The 2:1 multiplexers 502 reduce the number of direct connections to interface unit 303 from source lines 410 by a factor of two, as compared to the no-multiplexer, no-dual-gate configuration 400 depicted in FIG. 4A. The 2:1 multiplexers 502 therefore allow a relatively larger number of output pads 310 extending from processing unit interface module 303 to be used for touch sensing, since fewer pads are coupled to display elements. More specifically, because of the presence of the 2:1 multiplexers 502, the outputs from the input/output pads are coupled to half as many source lines 410 as with the first configuration 400. Therefore, additional common pads 310 are available for touch sensing. However, the amount of time allocated to driving subpixel elements 404 is doubled as compared with the first configuration 400, assuming the same number of subpixel elements 404.

FIG. 5B is another timing diagram 550 that illustrates various signals involved in activating the subpixel elements 404 in the 2:1 multiplexer configuration 500. The timing diagram 550 includes a first source graph 552, a second source graph 554, a first multiplexer graph 556, a second multiplexer graph 558, and a gate graph 560. The first source graph 552 corresponds to a first source line 410, and the second source graph 554 corresponds to a second, source line 410, adjacent to the first source line 410. The gate graph 560 corresponds to a gate line 412 for a single row of subpixel elements 404. The first multiplexer graph 556 corresponds to a selection signal selecting a first input for the 2:1 multiplexers 502. The second multiplexer graph 558 corresponds to a selection signal selecting a second input for the 2:1 multiplexers 502.

The first source graph 552 indicates that within a first time period 562, source data is provided to a first subpixel element 404 ($SP_{1-1}$) in a first row of subpixel elements 404. Similarly, the second source graph 554 indicates that within the first time period 562, source data is provided to a second subpixel element 404 ($SP_{3-1}$) in the first row of subpixel elements 404. In one embodiment, the second subpixel element 404 is two subpixel elements 404 over from the first subpixel element 404. In other words, a third subpixel element 404 ($SP_{2-1}$) is between the first subpixel element 404 and the second subpixel element 404.

The first subpixel element 404 and the second subpixel element 404 are coupled to the first output of two different, adjacent 2:1 multiplexers 502. The first multiplexer graph 556 indicates that the first output for the 2:1 multiplexers 502 is selected in the first time period 562, and therefore that the first subpixel element 404 and the second subpixel element 404 are being provided with source data. The second multiplexer graph 558 indicates that the second output for the 2:1 multiplexers 502 is selected in the second time period 564, and therefore that the first green subpixel element 404 and a fourth subpixel element 404 ($SP_{1-2}$) are being provided with source data. In one embodiment, the fourth subpixel element 404 is adjacent to the third subpixel element 404 and is of the same color as the first subpixel element 404.

The gate graph 560 indicates that the gate line 412 for the row of subpixel elements 404 corresponding to the gate graph 560 is asserted during both the first time period 562 and the second time period 564. Since this gate line 412 is asserted, the first subpixel element 404, the second subpixel element 404, the third subpixel element 404, and the fourth subpixel element 404 are turned on during both the first time period 562 and the second time period 564.

In combination, the first multiplexer graph 556, the second multiplexer graph 558, and the gate graph 560 indicate the timing of adjacent subpixel elements 404 in a 2:1 multiplexer configuration 500. Specifically, within a single row of subpixel elements 404, the 2:1 multiplexers 502 first select one half of the subpixel elements 404, and then select the other half of the subpixel elements 404. When the first half of subpixel elements 404 is selected, source data is provided to that first half of subpixel elements 404, and when the second half of subpixel elements 404 is selected, source data is provided to that second half of subpixel elements 404. The gate line 412 corresponding to that single row of subpixel elements 404 is asserted while both the first half of subpixel elements 404 and the second half of subpixel elements 404 are being provided with source data. Parasitic capacitance on the source line 410 associated with source graph 552 maintains the voltage as set by source graph 552 while multiplexer graph 556 is asserted. Parasitic capacitance on the source line 410 associated with source graph 554 maintains the voltage as set by source graph 554 while multiplexer graph 558 is asserted. Thus, even when multiplexer graphs 556 and/or 558 are not asserted, the associated source lines maintain their voltages and continue to charge the subpixels associated with the associated gate graph 560.

Because source data is provided during two separate time intervals for each row, the amount of time allocated to provide subpixel data to all of the subpixel elements 404 in a display having a 2:1 multiplexer configuration 500 is double the amount of time associated with the no-multiplexer no-dual-gate configuration 400, assuming the same number of subpixel elements. However, half of the number of pads in interface module 303 are used for display in the 2:1 multiplexer configuration 500 as with the no-multiplexer no-dual-gate configuration 400. Thus, more pads in common pads 310 may be used for touch in the 2:1 multiplexer configuration 500, which allows for a high touch resolution, assuming the same number of subpixel elements 404. A higher touch resolution may be useful for larger displays, for example.

FIG. 6A illustrates a third configuration 600, in which source lines 410 are shared between adjacent columns of subpixel elements 404, and alternating subpixel elements 404 are coupled to different gate lines 412, in a dual-gate configuration. The dual-gate configuration allows for a single group of subpixel elements 404 in a particular row to be activated by one gate line 412 and then a second group of subpixel elements 404 in the same row to be activated by another gate line 412. This scheme reduces the number of pads from interface module 303 needed for driving the subpixel elements 404, since each source line 410 is coupled to two columns of subpixel elements 404. Again, as with the 2:1 multiplexed configuration 500, the additional pads available for touch sensing allows the use of additional sensor electrodes 120 for touch sensing, which allows for finer-grained touch sensing.

Figure 6B:
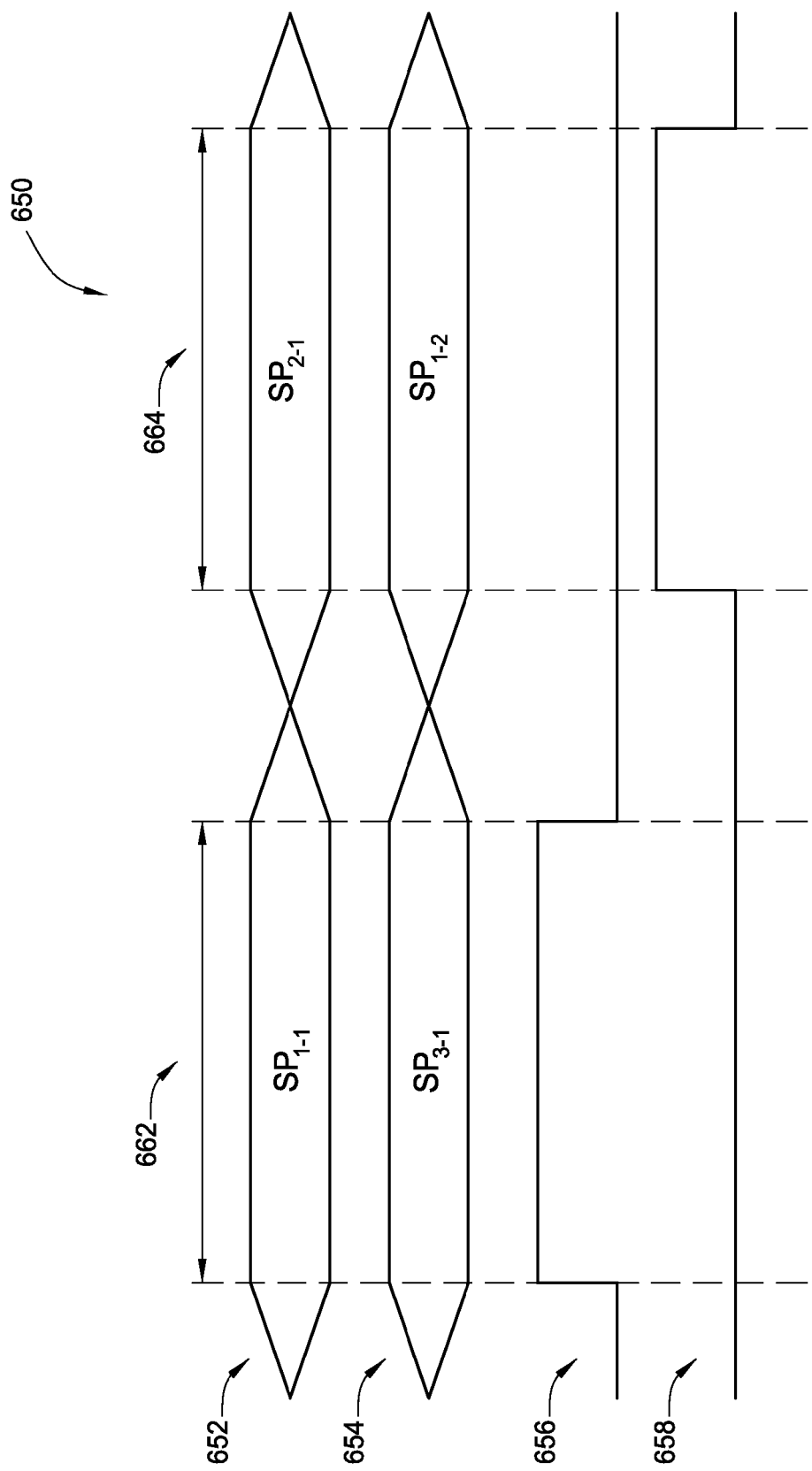
FIG. 6B is another timing diagram that illustrates various signals involved in activating the subpixel elements in the dual gate configuration.

FIG. 6B is another timing diagram 650 that illustrates various signals involved in activating the subpixel elements 404 in the dual gate configuration 600. The timing diagram 650 includes a first source graph 652, a second source graph 654, a first gate graph 656, and a second gate graph 658. The first source graph 652 corresponds to a first source line 410, and the second source graph 654 corresponds to a second source line 410 adjacent to the first source line 410. The first gate graph 656 corresponds to a first gate line 412 corresponding to a single row of subpixel elements 404 and the second gate graph 658 corresponds to a second gate line 412 that also corresponds to the same single row of subpixel elements 404. The first gate graph 656 is coupled to half of the subpixel elements 404 in the single row and the second gate graph 658 is coupled to the other half of the subpixel elements 404 in the single row.

The first source graph 652 indicates that within a first time period 662, source data is provided to a first subpixel element 404 ($SP_{1-1}$) in a first row of subpixel elements 404, through a first source line 410. Similarly, the second source graph 654 indicates that within the first time period 662, source data is provided to a second subpixel element 404 ($SP_{3-1}$) in the first row of subpixel elements 404, through a second source line 410. The second subpixel element is two subpixel elements 404 over from the first subpixel element 404. In other words, a third subpixel element 404 ($SP_{2-1}$) is between the first subpixel element 404 and the second subpixel element 404. The second source graph 654 indicates that within a second time period 664, source data is provided to the third subpixel element 404 and to a fourth subpixel element 404 ($SP_{1-2}$). In one embodiment, the fourth subpixel element 404 is adjacent to the third subpixel element 404 and is of the same color as the color of the first subpixel element 404.

The first subpixel element 404 and the second subpixel element 404 are coupled to the first gate line 412 and to the first source line 410. The third subpixel element 404 and the fourth subpixel element 404 are coupled to the second gate line 412 and to the second source line 410. The first gate graph 654 indicates that the first subpixel element 404 and the second subpixel element 404 are both switched on during the first time period 662. Thus, during the first time period 662, the first subpixel element 404 and the second subpixel element 404 receive source data, through the first source line 410 and the second source line 410, respectively. The second gate graph 656 indicates that the third subpixel element 404 and the fourth subpixel element 404 are both switched on during the second time period 664. Thus, during the second time period 664, the third subpixel element 404 and the fourth subpixel element 404 both receive source data through the second source line 410 during the second time period 664.

In combination, the first gate graph 656 and the second gate graph 658 indicate the timing of adjacent subpixel elements 404 in the dual-gate configuration 600. Specifically, within a single row of subpixel elements 404, the dual gate lines 412 first switch on one half of the subpixel elements 404, and then switch on the other half of the subpixel elements 404. When the first half of subpixel elements 404 is switched on, source data is provided to that first half of subpixel elements 404, and when the second half of subpixel elements 404 is selected, source data is provided to that second half of subpixel elements 404.

Because source data is provided during two separate time intervals for each row, the amount of time allocated to provide subpixel data to all of the subpixel elements 404 in a display having a dual-gate configuration 600 is double the amount of time associated with the no-multiplexer no-dual-gate configuration 400, assuming the same number of sub-pixel elements 404. However, half of the number of pads in interface module 303 are used for display in the dual-gate configuration 600 as with the no-multiplexer no-dual-gate configuration 400. Thus, more pads in common pads 310 may be used for touch in the dual-gate configuration 600, assuming the same number of subpixel elements 404, which allows for a higher touch resolution. A higher touch resolution may be useful for larger displays, for example.

Figure 7:
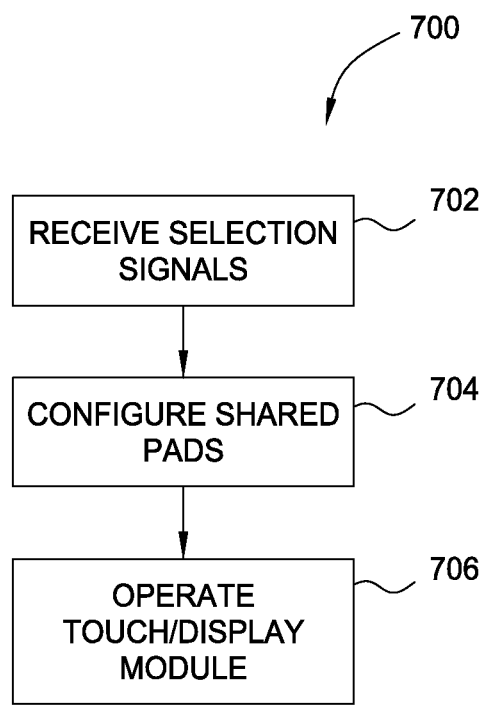
FIG. 7 illustrates a method for operating the interface module to accommodate various configurations.

FIG. 7 illustrates a method for operating the interface module 303 to accommodate various configurations, such as the first configuration 400, the second configuration 500, and the third configuration 600. The method 700 begins at step 702, in which selection circuitry 302 receives selection signals determining which shared pads 310 are to be used for display purposes and which shared pads 310 are to be used for touch purposes. In step 704, the selection circuitry 302 configures the shared pads 310 according to the selection signals. In step 706, the interface module 303 operates the touch/display module 305 according to a timing scheme associated with the particular configuration determined by the selection signals.

Thus, the embodiments and examples set forth herein were presented in order to best explain the embodiments in accordance with the present technology and its particular application and to thereby enable those skilled in the art to make and use the invention. However, those skilled in the art will recognize that the foregoing description and examples have been presented for the purposes of illustration and example only. The description as set forth is not intended to be exhaustive or to limit the invention to the precise form disclosed.

In view of the foregoing, the scope of the present disclosure is determined by the claims that follow.

What is claimed is:

1. A processing system for a display device comprising an integrated capacitive sensing device, the processing system comprising a touch and display interface chip comprising: a plurality of input/output pads comprising:
   a first input/output pad configured to be coupled with a first subpixel data line of a plurality of subpixel data lines of the display device;

a second input/output pad configured to be coupled with a first external touch trace of a plurality of external touch traces of the integrated capacitive sensing device; and a plurality of shared pads, each of the plurality of shared pads configured to be coupled with one of the plurality of subpixel data lines or one of the plurality of external touch traces coupled to the first input/output pad and configured to drive a first subpixel data signal onto the first subpixel data line;

sensor circuitry coupled to the second input/output pad and configured to drive a first sensor electrode via the first external touch trace;

selection circuitry coupled to the display circuitry, the sensor circuitry, and at least one shared pad of the plurality of shared pads, the selection circuitry is configured to selectively couple the at least one shared pad to the display circuitry for display updating and to the sensor circuitry for capacitive sensing; and a selection mechanism coupled to the selection circuitry and configured to control the selection circuitry to select between coupling the at least one shared pad with the display circuitry and the sensor circuitry, wherein the selection mechanism comprises a configuration register configured to switch the at least one shared pad between coupling to the display circuitry for display updating and coupling to the sensor circuitry for capacitive sensing.

2. The processing system of claim 1, wherein:
the display circuitry includes a display circuitry port that is coupled to the first input/output pad;
the sensing circuitry includes a sensing circuitry port that is coupled to the second input/output pad; and
the selection circuitry is configured to select between the display circuitry port and the sensing circuitry port for the at least one shared pad.

3. The processing system of claim 1, wherein the first sensor electrode is one of a plurality of sensor electrodes that each comprises one or more common voltage layer segments of the display device.

4. The processing system of claim 1, wherein:
the display device includes:
a plurality of subpixel elements arranged in a plurality of columns,
wherein each subpixel data line in the plurality of subpixel data lines is coupled to a different column of subpixel elements, and
one or more of the plurality the input/output pads is configured to be coupled to a different subpixel data line in the plurality of subpixel data lines.

5. The processing system of claim 4, wherein the display circuitry is configured to drive each of the subpixel data lines in the plurality of subpixel data lines in the same time period to drive a single row of subpixel elements included in the display device.

6. The processing system of claim 1, wherein:
the display device includes:
a plurality of subpixel elements arranged in a plurality of columns, and
a plurality of multiplexers, each having two inputs,
wherein each subpixel data line in the plurality of subpixel data lines being coupled to a different column of subpixel elements,
the plurality of subpixel data lines is coupled to a the plurality of multiplexers, and at least two input/output pads of the input/output pads is configured to be coupled to a common multiplexer of the plurality of multiplexers.

7. The processing system of claim 6, wherein the display circuitry is configured to drive a first half of the plurality subpixel data lines, via a first input in each of the plurality of multiplexers, in a first time period, and to drive a second half of the plurality of subpixel data lines, via a second input in each of the plurality of multiplexers, in a second time period.

8. The processing system of claim 1, wherein:
the display device includes:
a plurality of subpixel elements arranged in a plurality of columns and a plurality of rows, and
a plurality of gate lines, wherein each row of the plurality of rows is coupled to a different pair of the of the plurality of gate lines, and each subpixel data line in the plurality of subpixel data lines being coupled to two different rows of the plurality of rows.

9. The processing system of claim 8, wherein the display circuitry is configured to drive each of the subpixel data lines while asserting a first gate line for a one of the rows of subpixel elements in a first time period, and to drive each of the subpixel data lines while asserting a second gate line for the row in a second time period.

10. The processing system of claim 1, wherein the selection circuitry is further configured to:
receive a second subpixel data signal from the display circuitry and a sensing signal from the sensing circuitry; and wherein selectively coupling the at least one shared pad with the display circuitry and the sensor circuitry comprises selectively driving the at least one shared pad with the second subpixel data signal and the sensing signal.

11. An input device, comprising:
a plurality of subpixel data lines, each of the plurality of subpixel data lines is coupled to at least one of a plurality of subpixel elements of a display device;
a plurality of external touch traces;
a plurality of sensor electrodes coupled to of the plurality of external touch traces, wherein a one or more of the plurality of sensor electrodes comprises at least one common electrode of a display device; and
a processing system comprising:
a plurality of input/output pads comprising:
a first input/output pad configured to be coupled with a first subpixel data line of the subpixel data lines;
a second input/output pad configured to be coupled with a first external touch trace of the plurality of external touch traces; and
a plurality of shared pads, each of the plurality of shared pads configured to be coupled with one of the plurality of subpixel data lines or one of the plurality of external touch traces;
display circuitry coupled to the first input/output pad and configured to drive a first subpixel data signal onto the first subpixel data line;
sensor circuitry coupled to the second input/output pad of sensor electrode of the plurality of sensor electrodes for capacitive sensing via the first external touch trace;
selection circuitry coupled to the display circuitry, the sensor circuitry, and at least one shared pad of the plurality of shared pads, the selection circuitry is configured to select between configuring the at least one shared pad for display updating and for capacitive sensing; and a selection mechanism coupled to the selection circuitry and configured to control the selection circuitry to select between coupling the at least one shared pad with the display circuitry and the sensor circuitry, wherein the selection mechanism comprises a configuration register configured to switch the at least one shared pad between coupling to the display circuitry for display updating and coupling to the sensor circuitry for capacitive sensing.

12. The input device of claim 11, wherein:
the display circuitry includes a display circuitry port that is coupled to the first input/output pad;
the sensing circuitry includes a sensing circuitry port that is coupled to the second input/output pad; and
the selection circuitry is configured to select between the display circuitry port and the sensing circuitry port for the at least one shared pad.

13. The input device of claim 11, wherein:
the display device includes:
a plurality of subpixel elements arranged in a plurality of columns,
wherein each subpixel data line in the plurality of subpixel data lines is coupled to a different column of subpixel elements, and
each input/output pad of the input/output pads is coupled to a different subpixel data line in the plurality of subpixel data lines.

14. The input device of claim 13, wherein the display circuitry is configured to drive each of the subpixel data lines in the plurality of subpixel data lines in the same time period to drive a single row of subpixel elements included in the display device.

15. The input device of claim 11, wherein:
the display device includes:
a plurality of subpixel elements arranged in a plurality of columns,
wherein each subpixel data line in the plurality of subpixel data lines being coupled to a different column of subpixel elements, and
the input device further comprises a plurality of multiplexers, each having two inputs,
each subpixel data line in the plurality of subpixel data lines is coupled to a different output of a multiplexer in the plurality of multiplexers, and
at least two input/output pads of the input/output pads is configured to be coupled to a common multiplexer of the plurality of multiplexers.

16. The input device of claim 15, wherein the display circuitry is configured to drive a first half of the subpixel data lines in the plurality of subpixel data lines, via a first input in each of the multiplexers, in a first time period, and to drive a second half of the subpixel data lines in the plurality of subpixel data lines, via a second input in each of the multiplexers, in a second time period.

17. The input device of claim 11, wherein:
the display device includes:
a plurality of subpixel elements arranged in a plurality of columns and a plurality of rows,
wherein each subpixel data line in the plurality of subpixel data lines being coupled to two different columns of subpixel elements, and
wherein the input device further comprises a plurality of gate lines, each gate line being coupled to half of the subpixel elements included in a row of subpixel elements.

18. The input device of claim 17, wherein the processing system is configured to: drive each of the subpixel data lines of the plurality subpixel data lines while asserting a first gate line for a one of the rows of subpixel elements in a first time period, and drive each of the subpixel data lines while asserting a second gate line for the row, during a second period.

19. A method for operating a display device comprising an integrated capacitive sensing device, the method comprising:
driving a first subpixel data signal onto a first subpixel data line of the display device to update a first display element of the display device through a first input/output pad of a plurality of input/output pads, the first input/output pad is coupled to display circuitry, and the plurality of input/output pads is formed on a single integrated circuit (IC) chip, and the plurality of input/output pads comprises a plurality of shared pads configured to be shared between display updating and capacitive sensing;
driving a sensor electrode of the integrated capacitive sensing device for capacitive sensing through a first external touch trace coupled to a second input/output pad of the plurality of input/output pads, the second input/output pad is coupled to sensor circuitry; and
operating selection circuitry with a selection control signal provided by a selection mechanism comprises a configuration register to select between configuring at least one shared pad of the plurality of shared pads for display updating by driving the at least one shared pad with a second subpixel data signal provided by the display circuitry and for capacitive sensing by driving the at least one shared pad with the sensor circuitry.

20. The method of claim 19, further comprising:
communicating a second subpixel data signal from the display circuitry to the selection circuitry; and
communicating a sensing signal from the sensing circuitry to the selection circuitry,
wherein configuring the at least one shared pad for display updating and capacitive sensing comprises selectively driving the at least one shared pad with the second subpixel data signal for display updating and the sensing signal for capacitive sensing.

* * * * *

UNITED STATES PATENT AND TRADEMARK OFFICE
CERTIFICATE OF CORRECTION

| | |
|---|---|
| PATENT NO. | : 10,133,419 B2 |
| APPLICATION NO. | : 14/224032 |
| DATED | : November 20, 2018 |
| INVENTOR(S) | : Christopher A. Ludden and Jeffrey A. Small |

It is certified that error appears in the above-identified patent and that said Letters Patent is hereby corrected as shown below:

In the Claims

In Column 19, Line 66, Claim 6, after "to" delete "a".

In Column 20, Line 17, Claim 8, before "plurality" delete "of the".

In Column 20, Line 41, Claim 11, after "to" delete "of".

Signed and Sealed this
Twenty-first Day of April, 2020

Andrei Iancu
*Director of the United States Patent and Trademark Office*